United States Patent [19]

Muggli

[11] 4,199,246
[45] Apr. 22, 1980

[54] ULTRASONIC RANGING SYSTEM FOR A CAMERA

[75] Inventor: Juerg Muggli, Woburn, Mass.

[73] Assignee: Polaroid Corporation, Cambridge, Mass.

[21] Appl. No.: 3,371

[22] Filed: Jan. 5, 1979

Related U.S. Application Data

[63] Continuation of Ser. No. 840,802, Oct. 11, 1977, abandoned, which is a continuation of Ser. No. 729,392, Oct. 4, 1976, abandoned.

[51] Int. Cl.² ............................................. G03B 13/20
[52] U.S. Cl. .................................... 354/195; 354/25; 352/140; 367/101
[58] Field of Search ................. 354/25, 195; 352/140; 340/1 R, 3 FM

[56] References Cited

U.S. PATENT DOCUMENTS

| | | | |
|---|---|---|---|
| 3,404,400 | 10/1968 | Miller, Jr. | 340/3 FM |
| 3,435,407 | 3/1969 | Bertheas | 340/3 FM |
| 3,466,652 | 9/1969 | Heyser | 340/3 FM |
| 3,522,764 | 8/1970 | Biber et al. | 354/195 |
| 3,835,446 | 9/1974 | Rowlands | 340/3 FM |
| 4,103,309 | 7/1978 | Massa | 354/195 |

Primary Examiner—Russell E. Adams
Attorney, Agent, or Firm—David R. Thornton

[57] ABSTRACT

An ultrasonic ranging system for a camera includes an ultrasonic transducer responsive to a keying pulse for transmitting a frequency modulated burst of ultrasonic energy toward a subject. The leading half of the burst is a chirp whose frequency varies from a higher to a lower value; during the trailing half of the burst, the frequency remains substantially constant. The system also includes a receiver for processing an echo signal produced by the transducer on receipt of an echo within a predetermined time interval following the burst, and producing a range signal with a characteristic linearly related to the distance of a subject being photographed from the camera. A variable Q filter in the receiver filters echo signals produced by the transducer eliminates the need for a matched filter. The filter Q has a relatively low value during the initial portion of said predetermined time interval causing the bandwidth of the filter to be wide enough to pass all the frequencies of the chirp returned from a subject relatively close to the camera. During the remaining portion of the interval, the Q increases narrowing the filter bandwidth and optimizing it, with regard to the signal-to-noise ratio, for the constant frequency of the burst returned from a relatively remote subject. This arrangement reduces sensitivity of the receiver to echo cancellation due to interference between waves reflected from a nearby subject without adversely affecting the signal-to-noise ratio for returns from remote subjects. An accompanying change in filter admittance reduces angular sensitivity of the receiver to off-axis echoes.

53 Claims, 7 Drawing Figures

ULTRASONIC RANGING SYSTEM FOR A CAMERA

This is a continuation of application Ser. No. 840,802, filed Oct. 11, 1977, which was a continuation of a parent application Ser. No. 729,392, filed Oct. 4, 1976.

BACKGROUND OF THE INVENTION

This invention relates to an ultrasonic ranging system, and to a camera into which such a system is incorporated.

Ultrasonic ranging systems for cameras are disclosed in U.S. Pat. No. 3,522,764, German Patent No. 864,048 and I.B.M. Technical Disclosure Bulletin, Volume 9, No. 7, Dec., 1966, pp. 744-745. In each of the systems, ultrasonic energy is transmitted toward a subject to be photographed, and the subject reflects energy back to the camera. Characteristics of the transmitted and received signals are compared necessitating separate sending and receiving transducers, and a control signal representative of subject distance is produced. The control signal is used to drive the lens mount of the camera to a position functionally related to subject distance whereby the subject will be in focus.

In the U.S. Pat. No. 3,522,764, ultrasonic bursts are transmitted at 40 kHz with a period no less than the time required for sound to travel twice the maximum subject distance for which the lens mount is to be adjusted. Echoes from the subject, with the same periodicity as the transmitted bursts, are received in the intervals between the transmitted bursts, the time between transmission and reception of a burst being related to subject distance and used to establish the duty cycle of a first pulse generator. A second pulse generator, with the same frequency as the first, is associated with the lens mount, but the duty cycle of the second generator depends on the position of the lens mount. Movement of the lens mount takes place until the duty cycles of the two pulse generators are equalized.

In The German patent and in the I.B.M. publication, ultrasonic wave trains are frequency modulated with a period no less than the time required for sound to travel twice the maximum subject distance for which the lens mount is to be adjusted. The echoes from a subject are thus frequency modulated with the same periodicity as the transmitted energy, so that the subject range can be established by the instantaneous difference between the frequencies of the transmitted and received signals.

In addition to requiring two transducers, the known prior art systems have the disadvantages of requiring a considerable amount of time to establish subject range. At room temperature, sound travels at about 340 meters per second so that the time required for a burst to reach a target at 7 meters, which is the maximum distance for which focusing is usually required, is about 20 msec. Thus, each period of the above systems must be about 40 msec; and if ten periods are required to establish subject range, then about 0.5 seconds is consumed in achieving camera focus. Such elapsed time is relatively long with respect to human reflexes, with the result that this photography has to proceed in two successive and distinct steps: one involving focusing, and one involving shutter actuation.

For general ranging purposes, an ultrasonic pulse distance measuring device is disclosed in U.S. Pat. No. 3,454,922 wherein separated fixed frequency bursts are transmitted by a transducer, and a reflected echo is received by the same transducer after a period of time related to target range.

When a fixed frequency ultrasonic sound is utilized, it has been found that subjects within the acceptance angle of the transducer, and within the field of view of the camera, are often undetected. From experimental work, it appears that reflections from various points on the subject may interfere with each other thus cancelling or so weakening the echo at the receiver, that the latter cannot respond, and the subject remains undetected. This phenomenon is most noticeable for subjects that are relatively close to the transducer.

In the context of photographing a subject, the latter is considered to be close to the camera when it is within 2 meters from the camera. Since many photographs are taken with subjects at this relatively close range, the failure of the transponder to receive an echo from a relatively close subject would normally cause the lens mount to improperly positioned.

The side lobes associated with the radiation pattern of ultrasonic transmission give rise to another problem. An off-axis target relatively close to the transducer, and located within an attenuated side lobe of the antenna pattern, may have a surface condition or other characteristic which produces an echo of a strength comparable to a subject located on-axis at a considerable distance from the transducer. In such case, the lens mount of the camera may be set in accordance with the distance to the off-axis target rather than the subject being photographed, and an unfocused exposure would result. While the transducer can be made more directional by increasing its area, this expedient increases the size of the ranging equipment associated with the camera, and neutralizes one of the basic reasons for going to a single transducer whic is to reduce the size and weight of the ranging equipment.

It is therefore an object of the present invention to provide a new and improved ultrasonic ranging system wherein the problems and the deficiencies outlined above are reduced or substantially overcome.

It is a further object of the invention to provide an improved automatic focusing camera.

Another object is to provide a method of ranging for photographic operations.

SUMMARY OF THE INVENTION

The present invention provides an ultrasonic ranging system for a camera having a lens mount moveable to a position at which a subject being photographed is in focus. The system includes an ultrasonic transducer that responds to a keying pulse by transmitting a relatively short burst of frequency modulated ultrasonic energy, and a synchronized receiver for processing an echo signal produced by the transducer on receipt of an echo within a predetermined time interval (termed the receiver ranging time) following the burst. The receiver produces a range signal with a characteristic linearly related to the distance of a subject being photographed from the camera. For receiver synchronization, a variable Q filter in the receiver filters echo signals produced by the transducer, with the Q increasing during the predetermined time interval thereby avoiding the need for a matched filter.

It has been found, experimentally, that the strength of the return from close subjects is highly dependent on the frequency of the ultrasonic burst. If at one frequency the echo would be very small due to interference, there are other frequencies at which the echo would be large. On the other hand, the return from remote subjects is much less dependent on frequency.

The preferred form of the frequency-modulated burst is a leading half in the form of a chirp (using radar terminology) wherein the frequency decreases with time, and a trailing half in the form of a constant frequency equal to the lowest frequency of the chirp. Because of the chirp, energy at many different frequencies will be incident on a subject increasing the probability that some of the frequencies will be reflected back to the transducer by relatively close subjects even if other frequencies are lost because they set up cancelling interference patterns. The preferred format of the burst is to be distinguished from the approach taken in U.S. Pat. No. 2,433,782 which shows a single burst, frequency-modulated ultrasonic ranging system without a constant frequency portion. In the present invention, the frequency values and their time-wise distribution are selected to minimize both the effects of absorption at all ranges and the cancellation of echoes at close range without adversely affecting the signal-to-noise ratio for long range echoes.

During the initial portion of the receiver ranging time in which any return will be from a relatively close subject and will likely include many different frequencies in the chirp, the Q of the filter is made low insuring that the filter bandwidth will be wide enough to accommodate all of the chirp frequencies. The low Q allows more noise reception, however, the latter is offset by the strong signal from close subjects. During the final portion of the receiver ranging time in which any return will be from a relatively distant subject and will, due to absorption, probably exclude the higher chirp frequencies, the filter is altered to a higher Q with the bandwidth narrow and centered on the constant frequency. Thus the receiver has reduced sensitivity to the effects of cancellation with only a slight compromise in the signal-to-noise (S/N) ratio for remote subjects.

The lower value of Q of the filter during the initial portion of the receiver ranging time has the added benefit of decreasing the response time of the filter (more rapid rise in filter response) for echoes from subjects close to the camera as compared to subjects more remote therefrom. Consequently, the accuracy will be better for subjects that are close than for more remote subjects, an advantageous situation in photography where the focus is more sensitive to errors in the lens mount position for close subjects.

The admittance of the variable Q filter increases during the receiver ranging time causing the receiver, in effect, to amplify echo signals from remote subjects more than nearly subjects. This technique decreases the angular sensitivity of the transducer and discriminates against echoes from nearly off-axis targets which result from side lobes of the angular field pattern of the transducer.

The receiver of the present invention may also include detector means responsive to the output of the filter for producing a range signal when the output exceeds a predetermined level. The time of detection measured from the keying pulse is representative of the subject distance.

The invention also consists in a camera having an ultrasonic ranging system like that described above. Such camera has means responsive to the range signal for moving the lens mount of the camera to a position determined by the delay between the keying pulse and the range signal.

BRIEF DESCRIPTION OF THE DRAWINGS

Embodiments of the present invention are illustrated in the accompanying drawings wherein.

DESCRIPTION OF THE PREFERRED EMBODIMENT

Figure 1:
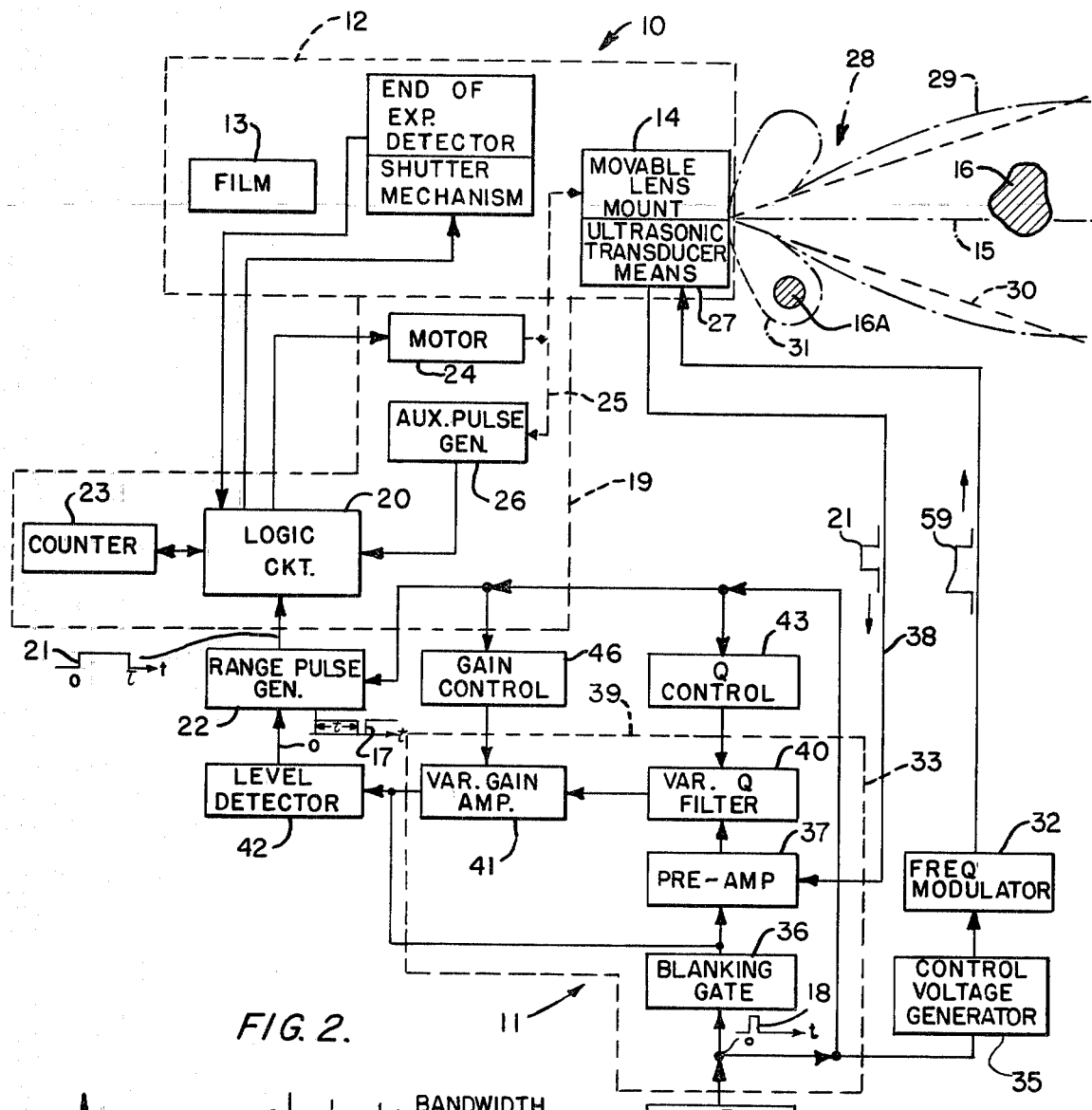
FIG. 1 is a block diagram of a general form of an ultrasonic ranging system according to the present invention showing the system incorporated into a camera.

Referring now to FIG. 1, reference numeral 10 designates a camera into which an ultrasonic ranging system 11 according to the present invention has been incorporated. Camera 10, which is shown in schematic form, includes housing 12 within which film 13 is supported opposite lens mount 14 which is axially displaceable along the optical axis 15 between spaced terminal positions. At one terminal position, lens mount 14 is positioned to focus subject 16 onto the plane of film 13 when the subject is close to the camera, e.g., about 25cm away. At the other terminal position of lens mount 14, subject 16 will be in focus when it is located beyond say 7.5 m from the camera. The position of lens mount 14 between the two terminal positions for bringing a subject into focus, is a predetermined function of the distance to the subject, such function being highly non-linear and being termed the lens/subject function.

In a manner to be described below, ultrasonic ranging system 11 produces a range pulse 17 that is delayed with respect to a keying pulse 18 by a period of time linearly related to the distance of subject 16 from the camera. Focusing mechanism 19 associated with the camera responds to the pulses 17 and 18 by moving the lens mount 14 to an axial position at which subject 16 will be in focus. Focusing mechanism 19 may take the form shown in copending application Ser. No. 729,289 filed on even date herewith in the name of Edwin K. Shenk and now abandoned and replaced by application Ser. No. 916,114, filed July 17, 1978. Alternatively, the focusing mechanism may take the form shown in U.S. Pat. No. 3,522,764.

In the construction shown in the above noted copending application, the focusing mechanism includes a logic circuit 20 which, in response to a range signal 21 generated by range pulse generator 22, produces a train of pulses whose number is representative of the axial position of the lens mount at which the subject will be in focus. Such pulses are gated into counter 23 and used for the purpose of driving motor 24 which is mechanically connected by means 25 to the lens mount 14. In addition, means 25 is also connected to a feedback system such as an auxiliary pulse generator 26 so that rotation of motor 24 under the control of the contents of counter 23 causes auxiliary pulse generator 26 to produce a predetermined number of pulses for each unit displacement of lens mount 14. Logic means 20 responds to the output of auxiliary pulse generator 26 for the purpose of determining when lens mount 14 has been moved to the position determined by the contents of counter 23 thus bringing the subject into focus.

The ultrasonic ranging system of the present invention designated by reference numeral 11 includes ultrasonic transducer means 27 which may include an electrostatic transducer element of the Sell-type similar to that disclosed in the article: Geide, K: "Oscillation Characteristics of Electroacoustic Transducers using the Sell Principle", *Acustica*, Vol. 10, pp. 295-303 (1960). The nature of the main and side lobes of the preferred form of element 27A depends on the output pattern of the backing plate (not shown) of the element. For a transducer of given size driven at a given frequency, the narrowest beam is produced by a constant output across the transducer element. For example, a transducer of the type disclosed in the above article, with a 3.5 cm diameter active area driven at 50 kHz, has a half power angle of 6° off-center. The first zero occurs at 13° and the first side lobe at 19°. These angles are about inversely proportional to the diameter of the transducer and to the frequency; and the first side lobe may have a relative power of −17.6 dB for transmit and receive conditions; combined the relative power for the system is approximately −35 dB. Improved patterns would have slightly larger angles but smaller side lobes.

Transducer means 27 is physically located adjacent lens mount 14 and has a transmission pattern 28 with a main lobe 29 closely matching the field of view 30 of the lens mount. Associated with the main lobe of the pattern are side lobes 31. The precise form of the main and side lobes depending upon the specific design of the transducer element.

Ranging system 11 also includes control voltage generator 35, frequency modulator 32 for driving transducer means 27 and causing the latter to transmit a burst of ultrasonic energy towards subject 16 in response to a keying pulse 18 applied to generator 35, and receiver 33 for processing an echo signal 21 produced by the transducer in response to receipt of an echo from the subject within a predetermined interval of time (hereinafter termed the receiver ranging time) following the burst.

In operation, a manual input to the sytem, such as for example, the depression of a camera pushbutton (not shown), is converted, by leading edge detector 34, into keying pulse 18 which is applied to control voltage generator 35. The output of generator 35 controls frequency modulator 32 which causes transducer means 27 to produce a frequency-modulated burst. Generator 35 is effective to modulate the output voltage of modulator 32 such that, during half the transducer burst, the frequency changes between the limits of 65 to 50 kHz; and during the other half of the transducer burst, the frequency remains constant at about 50 kHz.

In view of experimental results showing that the return from a close subject is highly dependent on the frequency of the incident ultrasonic burst in the sense that cancellation of an echo can occur at certain frequencies, the provision of the chirp will insure the presence of many frequencies incident on the subject. At least some of the frequencies will be reflected back to the transducer without being cancelled. The provision of the 50 kHz constant frequency during half of the burst minimizes the effects of absorption on ultrasonic energy thus insuring a return from a remote subject under adverse ambient conditions. It is known, for example, that the reflected signal power varies exponentially with the distance of the subject and approximately inversely with the fourth power of the distance to the subject. For example, an approximately 60 dB variation in reflected signal power occurs when a subject is moved from 25 cm to 5 m using a 50 kHz signal at 20° C. It has been found from experiments that the absorption, and the variation of absorption, with temperature and humidity, increase rapidly with frequency. Generally speaking, the lower the frequency, the lower the absorption. For the frequencies of the preferred burst, the lowest absorption, for a given temperature and humidity, occurs for the 50 kHz signal.

Under adverse conditions of temperature and humidity, the higher frequencies in the burst are likely to be attenuated. Hence, they will be most effective for close subjects, which is precisely where interference is encountered were a single frequency used in the burst. The 50 kHz portion of the burst is the least attenuated of all of the frequencies present and so is suitable for subjects remote from the camera.

When subject 16 is relatively close to transducer means 27, the frequencies in the return signal incident on the transducer element will contain most of the frequencies in the chirp except those frequencies which have been cancelled by reason of interference. When the subject 16 is located more remotely from transducer means 27, the return signal is most likely to contain those frequencies least attenuated by the environment, namely the frequencies close to the lower frequency of the chirp.

The 65 to 50 kHz chirp portion and the 50 kHz constant portion of the burst can be arranged in eight different combinations. Half of these involve step-type discontinuities at the transition between the two portions. For reasons relating to simplification of the electronics for developing the control voltate that drives the modulator, the latter discontinuous burst arrangements are not preferred.

Turning to the other four possible (continuous) burst arrangements, it should be noted that the chirp portion could rise or fall to the constant frequency and could precede or follow the constant frequency portion. Now, at near distances, interference or so-called speckle is a problem while at far distances the signal-to-noise ratio is of most concern. Based upon the above, it is preferred to have the chirp first which provides the greater ranging accuracy of operating with the leading edge of the burst thereby permitting greater focusing accuracy desired for close subject distances. On the other hand, since lower frequencies are less absorbed, their use is preferable for far distances where signal-to-noise ratio is important. Consequently, a leading chirp which falls to a lower constant frequency was preferred with the frequency of the burst to start at 65 kHz and drop to 50 kHz in 0.5 msec, and then remain constant at 50 kHz.

Referring again to FIG. 1, keying pulse 18, upon initiating the operation of control voltage generator 35 and the transmission of a frequency-modulted ultrasonic burst from transducer means 27, is also applied to blanking gate 36 of the receiver 33. Blanking gate 36 produces a level that is applied to the output of the receiver 33 so as to enable the output approximately 0.4 ms following the termination of the transducer burst, and then maintains the output in active operation for a predetermined period of time, termed the receiver ranging time, which is preferably about 40ms in duration. In this interval of time, sound at sea level at 20° C. travels from the transducer to a target located about 7.3 m, and returns to the transducer. The 0.4 ms delay in enabling the output provides sufficient time for the transducer element of transducer means 27 to stablize following termination of the burst. As a result, the delay time defines the closest subject distance that can be accommodated by the ranging system, namely about 25 cm. As shown in FIG. 1, the output of the blanking gate 36 may also be applied to a pre-amplifier 37 to enable the latter following the indicated delay.

An echo signal, produced by transducer means 27 on receipt of a return from subject 16, is applied via line 38 to the pre-amplifier 37 whose output is processed by filter network 39 which as later explained in detail with regards to FIG. 3 includes variable Q filter 40, and amplifier 41 whose gain is optionally variable. Level detector 42 produces a range pulse 17 when the output of variable gain amplifier 4 reaches a threshold level.

Associated with variable Q filter 40 is programmed Q control circuit 43 which is responsive to keying pulse 18 for increasing the Q of the filter during the receiver ranging time. The center frequency of the filter is the lowest frequency of the burst, namely 50 kHz in the present situation. Control 43 may typically change the Q of the filter 40 from a value of 5 to a value of 70 during the receiver ranging time.

Figure 2:
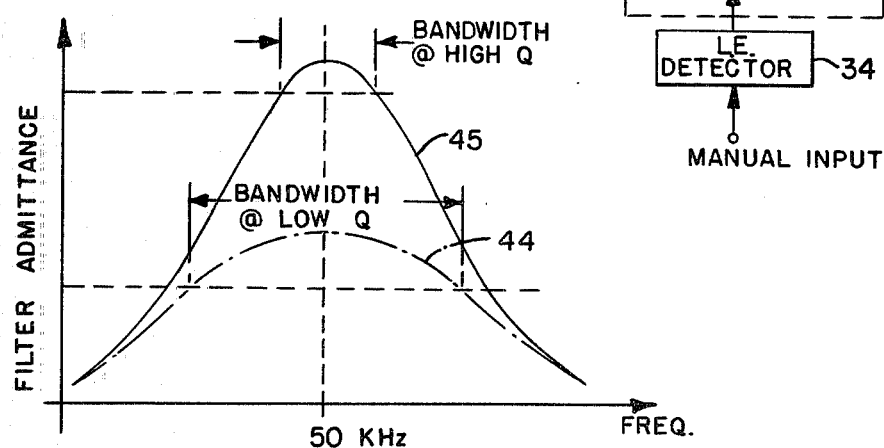
FIG. 2 is an idealized response diagram of a variable Q filter.

The admittance of Q filter 40 as a function of frequency is shown in FIG. 2 for different values of the parameter Q. When the Q of the filter 40 is low, as indicated by curve 44 in FIG. 2, the bandwidth of the filter 40 will be relatively wide, and in fact, will be sufficiently wide to pass all of the chirp frequencies. The Q of the filter 40 is relatively low during the initial portion of the receiver ranging time within which subjects close to the transceiver will supply an echo return to transducer means 27.

When the Q of the filter 40 is relatively high during the terminal portion of the receiver ranging time, the bandwidth of the filter will be relatively narrow and can be optimized with respect to signal-to-noise ratio. The 50 kHz portion of the burst will be most effective in reaching a subject remote from the transducer and will be strongly present in any return therefrom. Since the relatively narrow bandwidth of the filter occurs during the latter portion of the receiver ranging time, this is consistent with subjects remote from the camera.

As indicated in FIG. 2, the admittance of filter 40 when its Q is low will be significantly less than its admittance when the Q filter is relatively high. Consequently, the impedance of filter 40 will be higher during the initial portion of the receiver ranging time than during the final portion thereof. This has the effect of attenuating the output of pre-amplifier 37 for echo signals produced when a subject is close where the amplitude of the echo is likely to be large. The output of filter 40 thus tends to have a level independent of subject range.

In general, however, the gain of amplifier 41, which is a part of overall filter network 39, can be programmed using gain control circuit 46 associated with this amplifier. Control circuit 46 responds to the application of keying pulse 18 by producing a control signal which causes the gain of amplifier 41 to increase during the receiver ranging time. As a consequence of this operation, relatively weak echo signals associated with objects relatively remote from the transducer will be amplified to a greater extent than relatively strong echo signals from a subject closer to the transducer.

The advantages for varying the gain of the overall filter network is explained in connection with the presence of side lobes 31 shown in FIG. 1, and the presence of target 16A within one of the side lobes. Since target 16A is out of the field of view of the objective lens of the camera, it is highly desirable for the ranging system to discriminate against target 16A in favor of subject 16 which is within the field of view. The variation in admittance of filter 40 alone, or together with the variation in gain of amplifier 41 if filter 40 is not sufficient, cooperates in achieving this discrimination as explained below.

The return from target 16A will reach transducer means 27 before the return from subject 16 which is more remote from the transducer than target 16A. Not only will the signal strength of the return from target 16A be relatively low by reason of the strength of the side lobe, but the operation of filter 40 and amplifier 41 will be such as to insure that the signal reaching level detector 42 will be below the threshold of the detector. By the time the return from subject 16 reaches transducer means 27, the admittance of the filter will have increased (which means that the impedance of the filter 40 to the echo signal will have decreased) from its previous value presented to the return from target 16A. In addition, the gain of amplifier 41 will have increased from its previous value. Consequently, the output of amplifier 41 will exceed the threshold of detector 42 and cause range pulse 17 to be produced at a point in time corresponding to the range of subject 16 from the transducer.

In addition to the changes in Q of filter 40, which change the admittance of the filter in a way that beneficially decreased the angular sensitivity of the transducer and discriminates against off-axis targets, another beneficial result is achieved. Such result arises because the rise time of filter 40 is faster when the Q is relatively low than when the Q is higher. The relatively faster rise time thus occurs in connection with echo signals associated with objects relatively close to the camera. Since the rise time allows early detection of the leading edge of the echo, the more rapid rise time results in greater accuracy for the generation of range pulses associated with close subjects. This is consistent with the requirements for a camera since focus is more sensitive to errors at close range than to errors at distances more remote from the camera.

Figure 3:
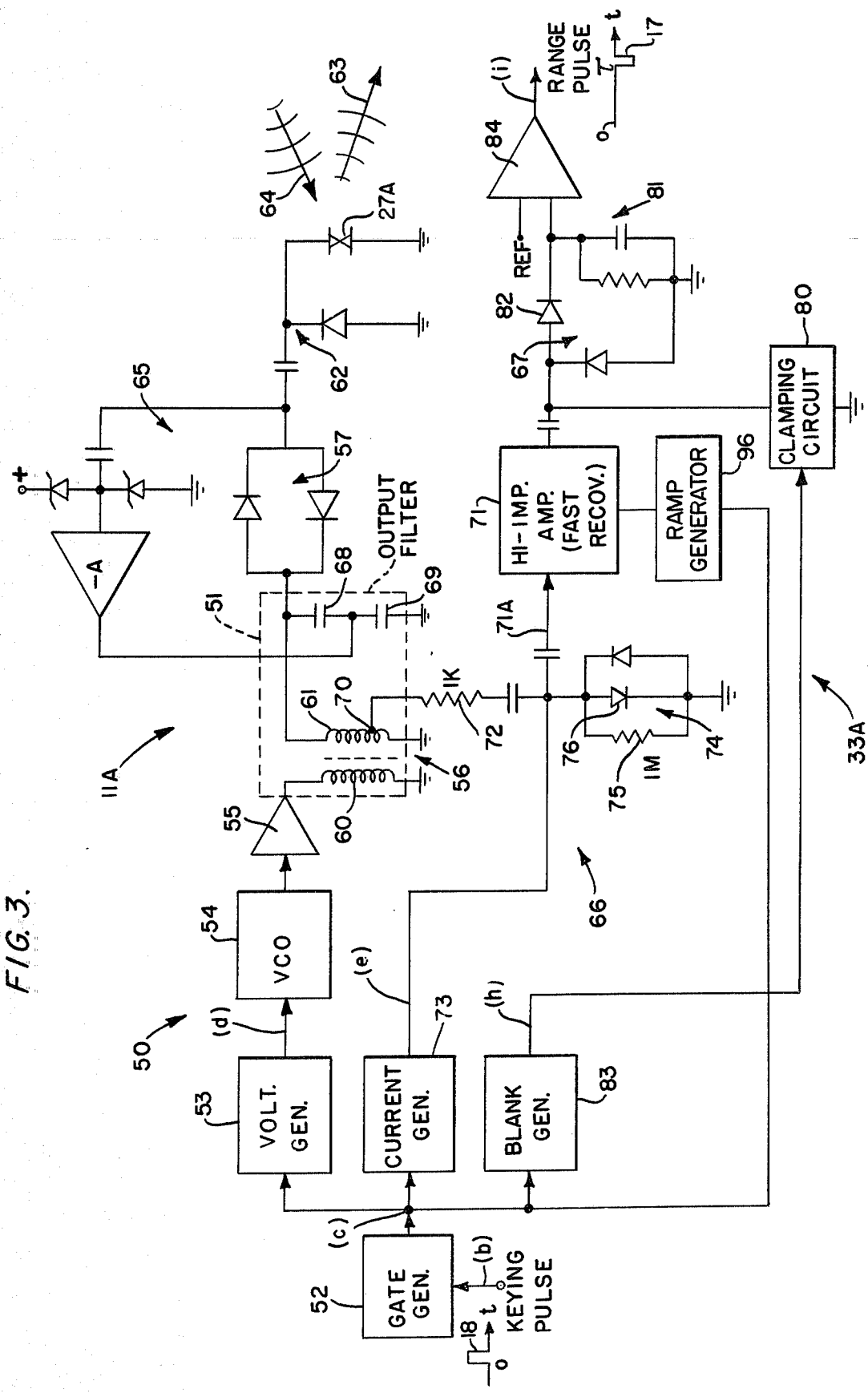
FIG. 3 is a detailed circuit diagram of a preferred form of the ranging system according to the present invention.

The preferred construction of an ultrasonic ranging system is shown in FIG. 3, and is designated by reference numeral 11a. System 11A includes ultrasonic transducer element 27A, modulator 50 for driving the element and causing it to transmit a frequency-modulated burst of ultrasonic energy toward a subject in response to the application of keying pulse 18 to the modulator, and receiver 33A, including filter 51, for processing an echo signal produced by element 27A in response to its receipt of an echo from a subject (not shown) within a predetermined time interval following the burst (i.e., within the ranging time of the system). Receiver 33A produces a range signal 17 delayed with respect to keying pulse 18 by a period of time $\tau$ linearly related to the subject distance (i.e., twice the time for sound to travel between the transducer and the subject).

Figure 4:
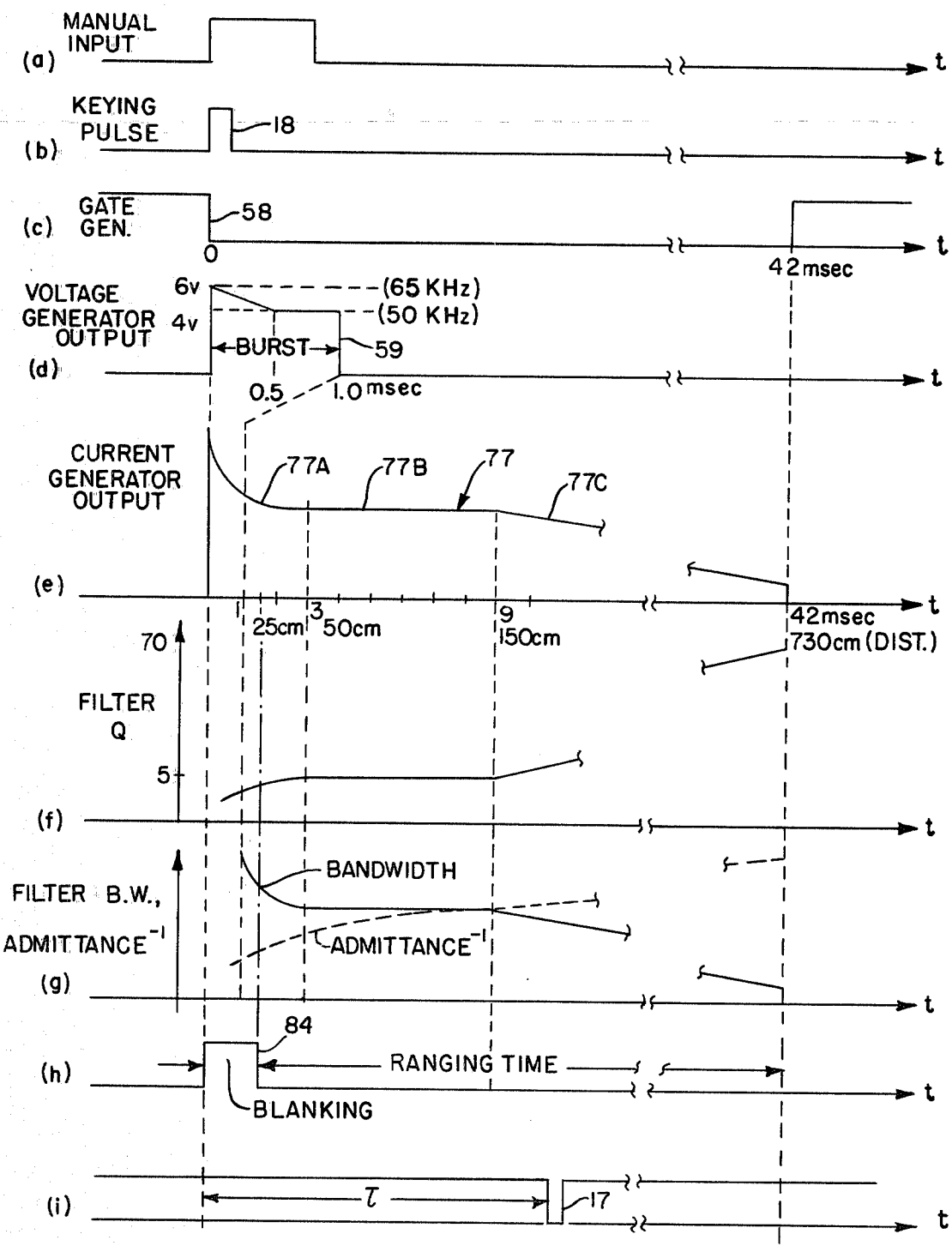
FIG. 4 is a waveform diagram showing idealized waveforms occurring at various locations in the system of FIG. 3.

Turning again to FIG. 3, a modulator 50 includes gate generator 52, voltage generator 53, voltage controlled oscillator 54, amplifier 55, transformer 56, and decoupling diodes 57. A keying pulse 18 applied at (b) to the input of gate generator 52 causes the latter to produce a gate signal 58 at (c). A single shot multivibrator with automatic delay reset or an RC delay in combination with a Schmitt trigger circuit may be employed for the gate generator 52. As shown in FIG. 4(c), gate signal 58 has a duration of about 40 msec, corresponding to the time required for sound to travel about 7 meters from the transponder to a target and back again, such distance corresponding to an infinity focus position of the lens mount. For subjects beyond 7 meters, the lens mount is positioned at its infinity focus, and this would cause the subject to be in focus.

Figure 5:
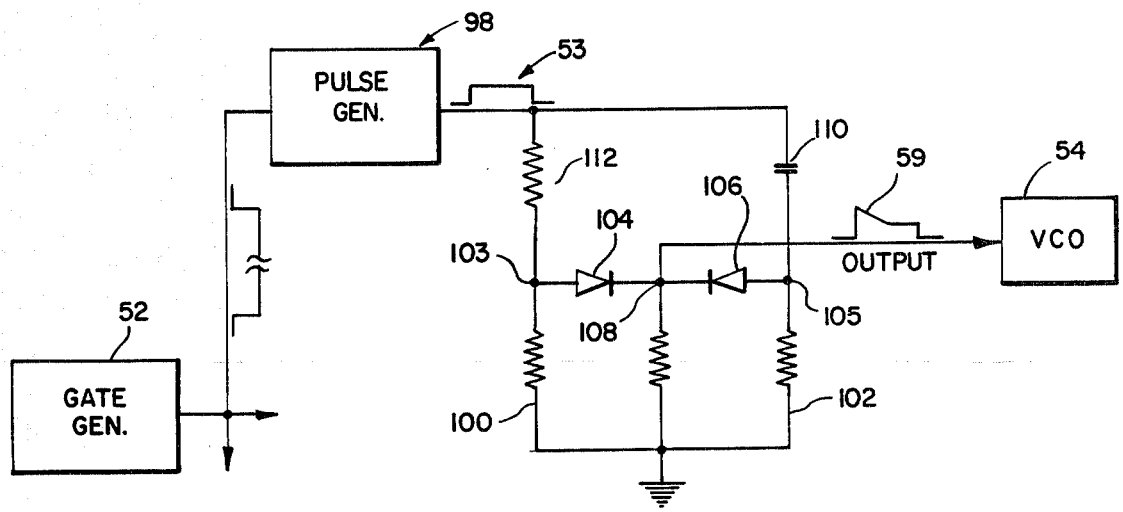
FIG. 5 is a circuit diagram of a voltage generator employed in the system of FIG. 3.

In response to the gate signal 58, voltage generator 53 produces the time-variable pulse 59 shown in FIG. 4(d). An exemplary voltage generator is shown in FIG. 5 wherein a conventional pulse generator 98, for example, a single shot multivibrator with automatic delayed reset upon triggering by the gate generator 52 produces a 1.0 ms input pulse (the length of the burst which is delivered to parallel circuit legs 100 and 102). The latter feeds appropriate voltage, from junctions 103 and 105, through a pair of diodes 104 and 106 respectively to an output junction 108 such that the latter transmits the higher voltage of either junction 103 or 105. During application of the input pulse, a capacitor 110 feeds a decaying voltage to the junction 105 while a resistor 112 provides a constant low voltage at junction 103 such that the output junction 108 initially experiences the decaying voltages from the junction 105 until the latter equals that of the junction 103 thereby producing shaped voltage pulse 59. Specifically, the voltage produced by generator 53 jumps from zero to six-volts at the start of the gate pulse and then decreases, substantially linearly, to about four-volts in 0.5 msec, thereafter remaining substantially at four-volts for another 0.5 msec and then decreasing to zero. The voltage values and variations are those actually used, but those skilled in the art will recognize that both the values and variations can be selected within a wide range consistent with the other components of the modulator.

The shaped voltage pulse 59 (see FIG. 4) applied to voltage control oscillator 54 causes the latter to develop a matching frequency-modulated burst. The frequency of the burst varying substantially linearly from about 65 kHz to about 50 kHz during the time the output voltage (pulse 59) of generator 53 decreases from six to four volts, and then remains substantially constant at about 50 kHz during the time the output voltage remains at about four volts. After amplification by amplifier 55, the frequency-modulated burst is applied to the primary 60 of transformer 56 whose secondary 61 is applied to transducer element 27A through decoupling diodes 57. The output voltage of secondary 61 is made as high as possible for the transducer 27A, for example, about 300 volts peak-to-peak, with a diode-capacitor combination 62 thereby establishes a bias voltage on element 27A of about 150 Vdc after several cycles. The output voltage drives element 27A causing it to radiate a highly directional, correspondingly frequency-modulated burst of ultrasonic energy as indicated by arrow 63 in FIG. 3.

The values of driving and bias voltages on element 27A are based on using a 6 μm Mylar film in the element. Thus, these values would be optimized for films of different thicknesses such that the output of the element and its sensitivity to echoes are simultaneously maximized. In addition, the Q of the output circuit, which depends in part of the capacitance of the transducer, should be relatively low in order for the chirp to be transmitted with a constant amplitude and with no significant dependence on the capacitance of the transducer. By maintaining a relatively low Q, the energy of the system dies rapidly at the termination of the drive voltage thus allowing the transducer element to quickly reach a quiesence condition at which it can receive echoes from relatively close subjects.

Decoupling diodes 57 function to decouple transformer secondary 61 from the transducer element during reception of an echo. During transmission, the voltage drop of about 0.7 volts across the diodes is so small with respect to the 300 volt peak-to-peak driving voltage, that the decoupling diodes have no effect on transmission. During reception, however, echo signals produced by element 27A are in the range of 2 $\mu$V to 20 mV; and the diodes are in effect an open circuit to the echo signals.

An echo from a subject is symbolically indicated at 64 in FIG. 3; and the resultant echo signal produced by element 27A is processed by receiver 33A which includes pre-amplifier 65, filter 51 referred to previously, means 66 for varying the Q of the filter during the receiver ranging time, and detector means 67 for converting an echo signal to range pulse 17. During the receiver ranging time, the dc voltage on element 27A remains substantially at 150 Vdc. The input impedance of pre-amplifier 65 is matched to the transducer element impedance (about 12 kΩ). The output impedance of the pre-amplifier is selected to be compatible with the highest Q of filter 51, which is about 70. The gain of the pre-amplifier is about 48 dB.

Filter 51 is an LC filter comprising secondary 61 of transformer 51 which furnishes the inductance of the filter, and capacitors 68, 69 between which the output of pre-amplifier 65 is connected. A tap 70 relatively close to the ground connection of the secondary applies the output of the filter to input 71A of high-impedance output amplifier 71 through resistor 72 which has a value of about 1 KΩ. Resistor 72, which is in parallel with the LC circuit of the filter, is a part of pre-programmed Q control means 66 for varying the Q of the filter. Q control means 66 also includes current generator 73 and dynamically variable resistance means 74 serially connected to resistor 72 and input 71A. Resistance means 74 comprises fixed resistor 75 (of about 1 MΩ) in parallel with diode 76 arranged to conduct during the time that the current generator 73 supplies current.

To provide the best signal-to-noise ratio for echo signals from subjects most remote from the camera (i.e., about 7 meters), the difference between the center frequency of the filter and the frequency at which the response power drops to half, $\Delta f$, is related to the constant frequency pulse length as follows: 0.2/(constant frequency pulse length). In the preferred embodiment, the half-power bandwidth of the filter should be about 0.8 kHz near the end of the receiver ranging time when echo signals from remote subjects are being processed. During the initial portion of the receiver ranging time, when echo signals from subjects close to the camera are being processed, the bandwidth of the filter must be such as to pass all of the frequencies of the chirp. Thus, the filter must initially have a half-power bandwidth of about 30 kHz, the center frequency being about 50 kHz. The required change in bandwidth is achieved by chaing the Q of the filter from about 5 near the beginning of the ranging time to about 70 near the end. For a typical LC circuit (with a capacitance of about 300 pf), the resistance in parallel with the circuit must vary from about 1 KΩ to about 1 MΩ.

The resistance in parallel with the LC circuit of filter 51 is the effective resistance of resistor 72 in series with the parallel combination of resistor 75 and diode 76. The dynamic resistance of diode 76, for small ac signals supplied by pre-amplifier 65, is about inversely proportional to the dc current flow through the diode, and will be substantially independent of the exact diode characteristics. When the dc current flow is relatively high, the dynamic resistance of the diode will be significantly smaller than the resistance of resistors 72 and 75, with the result that the effective resistance of filter 51 will depend substantially only on resistor 72. Consequently, the Q of the filter 51, under the condition of high current flow through diode 76, will depend on the value of resistor 72 which is selected, taking the inductance and capacitance of the filter 51 into account, to provide a Q which establishes the filter bandwidth such that all of the frequencies of the chirp are passed by the filter.

When the current through diode 76 is relatively low, the dynamic resistance of the diode will be of the same order of magnitude as the resistance of resistor 75 with the result that the effective resistance of filter 51 will depend essentially on the resistor 75. Consequently, the Q of the filter under the condition of low current flow through diode 76 will depend on the value of resistor 75 which is selected to establish a bandwidth matched as well as possible to the fixed frequency of the burst.

The time-wise variation in the current supplied to diode 76 by current generator 73 is such as to insure a suitable variation in the effective value of the resistance in parallel with the LC circuit of filter 51. To this end, generator 73 is responsive to gating pulse 58 for producing a dc current that is initially high for a relatively short time at the beginning of the receiver ranging time, and monotonically decreases as indicated by curve 77 in FIG. 4(e). Curve 77 is of a type that can be produced by relatively simple components with more assurance of repeatability and stability as compared to a monotonically increasing curve. A suitable current generator may be provided by a network of RC circuits, each having different time constants thereby providing diminishing current. Curve 77 has three portions: a transitional portion 77A lasting about 4 msec during which the current rapidly drops to a substantially constant level, an initial portion 77B lasting about 6 msec during which the current remains substantially constant, and a terminal portion 77C during which the current decreases substantially linearly. During portion 77A, the effective resistance in parallel with the LC circuit, increases, but the Q of the filter is primarily dependent on the value of resistor 72 and changes only slightly as indicated in FIG. 4(f). During portion 77B, the Q of the filter remains substantially constant. Thus, for objects within about 1.5 m from the transducer element, the bandwidth and admittance of the filter are substantially constant. For objects beyond 1.5 m, the bandwidth gradually decreases as the filter Q increases, and the filter admittance decreases see FIG. 4(g). The change in filter admittance can be thought of as changes in effective gain of the receiver, the effective gain being relatively low and sustantially constant for objects up to about 1.5 m from the transducer element, and increasing for subject distances beyond this point, which is in accordance with the principles set forth above.

Hence, the bandwidth remains essentially constant, at a relatively broad value for approximately 9 ms or approximately one-fifth to one-quarter of the predetermined range time of 42 ms and then gradually is narrowed during the remainder of the range time. Stated otherwise, the bandwidth and Q etc. remain constant during the initial portion of the range time when echos may be received from close up subjects (up to 1.5 meters from the camera) so as to ensure reception of all chirp frequencies and produce fast filter rise. Then, the bandwidth is narrowed during the remainder of the range time to increase the signal-to-noise ratio.

The output of filter 51 is applied is input 71A of amplifier 71 which has a high input impedance to prevent loading the filter and lowering its Q. The back-to-back diodes of Q control means 76 and the location of tap 70, limit the transmit pulse, but the amplifier 71 is still overdriven to some extent. It is designed to recover rapidly, however, and can handle a filtered echo signal after about 0.3 msec following the transmit pulse. The output impedance of this amplifier is low; and the gain is about 65 dB.

The output of amplifier 71 is applied to detector network 67 which includes a conventional clamping circuit 80, and RC integrator 81 and a detector 82. Circuit 80 is driven by blanking generator 83 which produces a blanking pulse 84 in response to gate pulse 58 as shown in FIG. 4(h). Pulse 84 lasts about 1.5 msec; and during this pulse, clamping circuit 80 is effective to clamp the detector input to ground.

Following the blanking pulse, an echo signal passed by filter 51 and amplified by amplifier 71 is rectified and correlated. The integrator 81 is constructed such that several cycles of an echo signal must be applied to the integrator within a given time span (say 0.2 msec) for the voltage to build up on the capacitor so as to reach the threshold of amplifier 84 which thereby forms a range pulse 17. While the correlation technique utilized does not improve the signal-to-noise ratio of the input signal, it does provide a filter for discriminating against single spikes such as may be present due to logic circuits associated with the mechanism for moving the lens mount of the camera.

As noted, the varied Q filter provides increasing gain during the transmit-receive time. However, the gain of the amplifier 71 may also be varied during the transmit-receive time by means of a ramp generator 96 which in response to the gating pulse 58 of gate generator 52 applies continuously increased gain control to amplifier 71 during the predetermined transmit-receive time of approximately 42 msec thereby providing substantially continuously increasing amplifier gain as the interval progresses.

With only slight modification, the circuit described above is capable of operation in several different modes. As noted in the preferred mode, a single burst, namely a single one msec duration transmit pulse, is utilized. This arrangement without amplifier ramp gain permits detection of objects at a distance of from 25 cm to about 5 m, the total time needed to measure the distance being less than about 35 msec; the latter being extended to about 9 m when amplifier ramp gain is employed. This mode is preferred with a snap-shot type camera since focusing can be effected and exposure completed with a single manual input.

Figure 6:
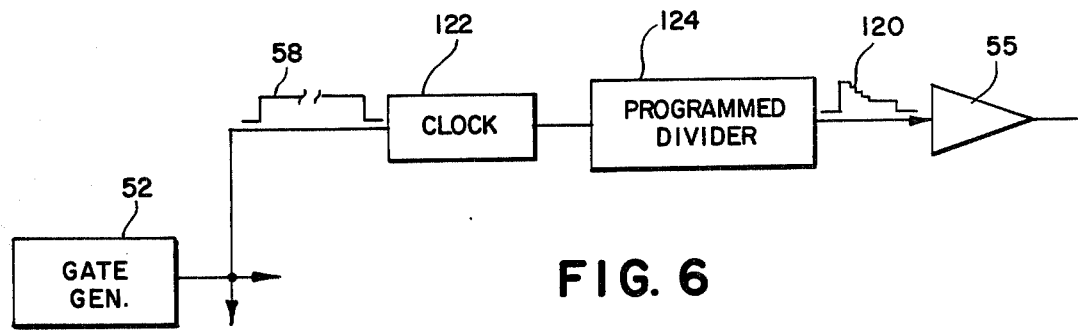
FIG. 6 is a block diagram of an alternate embodiment of the transducer drive shown in the ranging system of FIG. 3.
Figure 7:
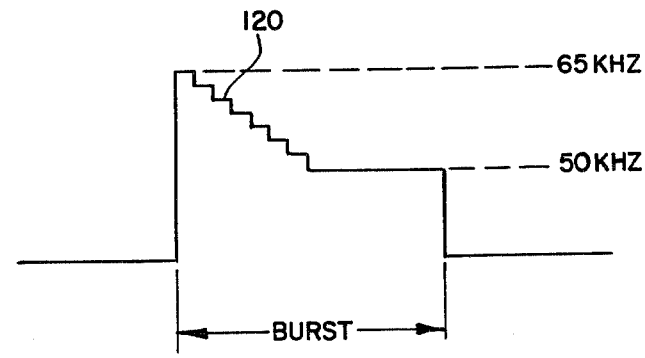
FIG. 7 is a waveform diagram of the ultrasonic burst produced with the embodiment of FIG. 6.

In an alternate embodiment, the chirp portion of the burst may be digitally formed in a stepped arrangement as shown in FIG. 6 wherein in response to the 42 msec gate pulse 58 from gate generator 52, a stepped frequency pulse 120 is provided by means of a clock 122 and programmed divider 124. As shown in FIG. 7, the pulse 120 falls in a series of small steps from 65 kHz to 50 kHz.

In another mode of operation, several different pulses could be used, one for each of several different ranges. For example, a short pulse could be used for objects from 10 cm to 1 m. A second and longer pulse could be used for longer distances. The Q of the filter would have to be adjusted to the pulse length, however; and the maximum Q would be different for different pulses. Since the signal-to-noise ratio is proportional to the square root of the pulse length, a change in pulse length would permit the range to be increased. If a system has a 5 m range with a 0.5 msec pulse, a system with a maximum pulse length of 5 msec could provide range information for objects up to 6.5 m. The Q of the filter, however, would preferably be ten times higher.

The present invention is also capable of being used in a continuous pulsing mode suitable for use with a movie camera enabling the focus to be adjusted continuously during the time the camera is running. Using a slow drive for moving the lens mount, an integration of the echoes would be achieved improving the signal-to-noise ratio.

The variation in filter Q in the preferred embodiment has many advantages when used in a ranging system for a camera. In most cases, the need for a separate ramp gain in the general form of the invention shown in FIG. 1 may be eliminated. Secondly, the need for a matched filter, which is required for reception of a chirp is eliminated, thereby simplifying the circuitry yet permitting the use of a chirp which reduces sensitivity to interference for close objects without significantly comprising the signal-to-noise ratio for remote objects. Thirdly, the filter Q is low for near-by objects where absolute accuracy is most needed, and a low Q filter has a fast rise time insuring good accuracy. Finally, an electronic drift in output frequency, as compared to the filter frequency, or the frequency shift produced by the movement of the target (Doppler effect), affects only the far distance, where the consequences are less important for a photographic camera. The larger the drift or frequency shift, the nearer will be the affected distance. This gradual influence has to be compared with the total disappearance of the echo at a certain drift at all distances for a constant Q system.

The selections of frequencies, pulse durations and the like are by way of example only, it being understood that these parameters are chosen in accordance with the use to which the ranging system of the present invention is applied. For example, the frequency of 50 kHz was selected on the basis of the largest distance to be measured reliably in the presence of acoustic and thermal noise. Other considerations are involved in frequency selection, such as transducer size, acceptance angle, etc.

Finally, the disclosed technique for varying the effective resistance of the filter is by way of example only. The resistance can be in series with the LC circuit instead of parallel; and this expedient would require different values of resistors. Alternative to the use of a current-controlled diode, an FET transistor operating in the depletion mode could be used, preferably with the transistor used in a parallel mode.

Ranging systems 11 and 11A have applicability more general than incorporation into cameras. For example, they are applicable to arrangements for assisting blind persons, or assisting in maintaining proper spacing between vehicles, or any operation requiring ranging information.

It is believed that the advantages and the improved results furnished by the apparatus of the present invention are apparent from the foregoing description of the preferred embodiment thereof. Various changes and modifications may be made without departing from the spirit and scope of the invention as sought to be defined in the claims that follow.

What is claimed is:

1. In a sonic ranging system including means actuatable for transmitting a burst of sonic energy toward a subject, for receiving and processing an echo from said subject, and for producing a range signal related to the range of said subject, the improvement comprising means for controlling said transmission means to produce a sonic burst having one portion varying in frequency and another portion of relatively constant frequency.

2. The system of claim 1 including the improvement wherein said means for receiving and processing said echo includes a filter, means for varying the bandwidth of said filter between relatively wide and narrow values during a predetermined interval following said transmission.

3. The system of claim 2 wherein said bandwidth varying means includes means for maintaining said bandwidth at a relatively broad value during an initial portion of said interval and for then altering said bandwidth to a relatively narrow value during the remainder of said interval.

4. The system of claim 2 wherein said bandwidth varying means includes means for maintaining said bandwidth substantially constant at a relatively broad value during approximately the initial one-fifth of said interval so as to insure reception of all frequencies in the echo of said burst from close-up subjects and for then gradually altering said bandwidth to a relatively narrow value as said interval progresses to thereby improve the signal-to-noise ratio for more distant subjects.

5. The improvement of claim 1 wherein said means for receiving and processing said echo includes a filter, and means for varying the Q of said filter during a predetermined time interval between relatively low and high values.

6. The system of claim 1 wherein said one portion is an initial portion of said burst, and said means for receiving and processing said echo includes a filter and means for varying the bandwidth of said filter from a relatively wide value to a comparatively narrow value during a predetermined time interval following said transmission.

7. The improvement of claim 1 wherein said one portion is an initial portion of said burst.

8. The improvement of claim 1 wherein said other portion is at least one-quarter of the length of said burst.

9. The improvement of claim 1 wherein said frequency of said other portion is equal to or less than the lowest frequency of said one portion.

10. The improvement of claim 1 wherein said one portion is an initial portion of said burst, said other portion is approximately the lowest frequency of said one portion, and the frequency of said one portion decreases from an initial value to approximately the frequency of said other portion.

11. The improvement of claim 1 wherein the frequency of said burst decreases during its initial portion from about 65 kHz to about 50 kHz where it remains substantially constant during the rest of said burst.

12. The improvement of claim 1 wherein said one portion is varied in discrete steps.

13. In a sonic ranging system including means actuatable for transmitting a burst of sonic energy toward a subject, for processing an echo from the subject within a predetermined interval of time following said transmission, and for producing a range signal related to the subject range, said processing means including a filter, the improvement comprising:
 (a) means for controlling said transmission means to produce a frequency modulated burst; and
 (b) means for varying said filter to alter the bandwidth thereof during said predetermined interval of time to correlate the varying response of said filter to selected frequency components of said burst.

14. The improvement of claim 13 wherein the frequency of one portion of said burst changes with time and the frequency of another portion remains relatively constant.

15. The system of claim 14 wherein the bandwidth of said filter is centered on substantially the frequency in said other portion of said burst and, at the beginning of said predetermined interval of time, is wide enough to comprehend the frequencies in said one portion of said burst, and said varying means includes means for decreasing said bandwidth during said predetermined interval so that the bandwidth of said filter for early echoes from close subjects is wider than the bandwidth for later echoes from more remote subjects.

16. The system of claim 13 wherein said filter has an adjustable Q, and said processing means includes a programmed Q control circuit for increasing the Q of said filter during said predetermined interval, an amplifier for amplifying the output of said filter, and a programmed gain control circuit for increasing the gain of said amplifier during said predetermined interval.

17. The improvement of claim 13 wherein the bandwidth of said filter is changed by changing its Q.

18. The improvement of claim 13 wherein the frequency of said burst decreases during its initial portion from about 65kHz to about 50kHz, and remains substantially constant at about 50kHz during the remainder of said burst, said bandwidth of said filter is centered at about 50kHz, and said bandwidth is about 30kHz at the beginning of said predetermined interval and decreases thereafter.

19. The improvement of claim 13 wherein the duration of said burst is about 1 ms.

20. The improvement of claim 13 wherein said means for varying the bandwidth of said filter includes a diode connected to said filter for forming a part of its resistance, and means for varying the dynamic resistance of said diode during said predetermined interval of time.

21. The improvement of claim 20 wherein said means for varying the dynamic resistance of said diode includes a programmed current generator for supplying a time-varying dc current to said diode.

22. A sonic ranging system having means for producing a keying pulse, comprising:
 (a) a sonic transducer arrangement;
 (b) a modulator driving said transducer arrangement for causing the latter to transmit a frequency-modulated burst of sonic energy toward a subject in response to the application of the keying pulse to said modulator;
 (c) a receiver including a filter for processing an echo signal produced by said transducer arrangement in response to its receipt of an echo from the subject within a predetermined time interval following said burst and for producing a range signal delayed with respect to the keying pulse by a period of time linearly related to the subject distance; and
 (d) means for varying the Q of said filter during said predetermined interval of time to correlate the varying response of said filter to selected frequency components of said burst.

23. A sonic ranging system according to claim 22 including means for generating a time-variable control signal, and said modulator is responsive to said time-variable control signal for causing the frequency of said burst to vary during the initial portion thereof from a higher to a lower frequency and then to remain substantially constant during the remainder of said burst.

24. A sonic ranging system according to claim 22 wherein said receiver includes a pre-programmed Q control circuit for increasing the Q of said filter during said predetermined interval.

25. A sonic ranging system according to claim 22 wherein said receiver includes a detector responsive to the output of said filter for producing an output signal when the level of said filter output is above a predetermined level whereby said output signal constitutes said range signal.

26. A sonic ranging system according to claim 22 wherein said means for varying the Q of said filter includes a diode connected to said filter for forming a part of its resistance, and means for varying the dynamic resistance of said diode during said predetermined interval of time.

27. A sonic ranging system according to claim 26 wherein said means for varying the dynamic resistance of said diode is a current generator for supplying to said diode a variable current in response to the application to said generator of said keying pulse.

28. A sonic ranging system according to to claim 22 wherein said modulator includes a transformer whose secondary is connected to said transducer arrangement through a decoupler that decouples said secondary from said transducer arrangement when the latter produces an echo signal, and a variable frequency oscillator connected to the primary of the transformer, and wherein said filter is an LC filter whose inductance is constituted by said secondary of said transformer, and wherein a pre-amplifier shunts said decoupler and is connected to the capacitive side of said filter for applying echo signals to said filter.

29. A sonic ranging system according to claim 23 wherein said means for varying the Q of said filter includes current sensitive resistor means in said filter, and a current generator for providing a time-variable current to said resistor means during said predetermined interval of time.

30. A sonic ranging system according to claim 20 wherein said resistor means includes a diode connected to fixed resistors and, said current generator supplies said time-variable current to said diode for changing its dynamic resistance.

31. A sonic ranging system according to claim 22 wherein said filter comprises an LC circuit defining a filter with a given center frequency and said means for varying said Q includes a resistive element coupled with said LC circuit and means for dynamically varying the resistance of said resistive element for changing said filter Q as a function of time.

32. A camera having a sonic ranging system for automatically focusing the camera comprising:
   (a) a moveable lens mount whose position at which a subject is in focus is functionally related to the subject distance;
   (b) a shutter mechanism operatively associated with said lens mount;
   (c) selectively operable means for producing a keying pulse;
   (d) a sonic transducer arrangement for producing a sonic frequency responsive to electrical modulation and for producing an electrical signal responsive to a sonic signal;
   (e) a modulator driving said transducer arrangement for causing the latter to transmit a frequency-modulated burst of sonic energy toward a subject in response to the application of said keying pulse to said modulator;
   (f) a receiver including a filter for processing an echo signal produced by said receiver in response to receipt by said transducer arrangement of an echo from said subject within a predetermined time interval following said keying pulse;
   (g) means for varying the Q of said filter during said predetermined interval of time and for producing a range signal delayed with respect to said keying pulse by a period of time related to the subject distance; and
   (h) means responsive to said range signal for moving said lens mount in accordance with the delay of said range signal.

33. A camera according to claim 32 wherein said modulator includes means responsive to said keying pulse for generating a variable control voltage and means responsive to said varying control voltage for causing the frequency of said burst to vary during the first portion thereof from a higher to a lower frequency and to remain substantially constant during the remainder of said burst.

34. A camera according to claim 32 wherein said means for varying the Q of said filter includes resistor means for varying the resistance of said filter responsive to current flow through said resistor means, and a current generator for providing a variable current to said resistor means during said predetermined interval of time.

35. A camera according to claim 34 wherein said resistor means includes a diode connected to fixed resistors, said current generator supplying said variable current to said diode for changing its dynamic resistance.

36. A camera comprising:
   a housing having means for defining a focal plane;
   means for controlling the transmission of image carrying light rays to said focal plane from a subject to be photographed;
   means for varying said controlling means in accordance with a range signal related to the distance of said subject from said camera;
   means for producing said range signal, said signal producing means including means for producing a burst of sonic energy having both variable frequencies and a constant frequency and for receiving and processing an echo thereof from said subject, said signal producing means relying on echos of said varying frequencies for producing a range signal related to subjects at close distances and relying on an echo from said constant frequency from subjects at far distances.

37. The camera of claim 36 wherein said constant frequency is approximately equal to the lowest of said variable frequencies.

38. The camera of claim 36 wherein said signal producing means includes means for automatically varying said receiving means to the relative exclusion of said variable frequencies at a predetermined time following initiation of said burst in accordance with the earliest anticipated return of an echo from subjects at said far distances.

39. In a photographic camera including means for defining a focal plane, means for controlling the transmission of image carrying light rays to said focal plane from a subject to be photographed, means actuatable for transmitting a burst of sonic energy toward a subject, for receiving and processing an echo from said subject within a predetermined interval following said transmission, and for producing a range signal related to subject distance, the improvement comprising means for controlling said transmission means to produce a sonic burst having one portion varying in frequency and another portion of relatively constant frequency whereby said varying frequencies in said burst will produce an appropriate echo from relatively near subjects and said constant frequency will produce an appropriate echo for more remote subjects.

40. The camera of claim 39 including means responsive to said range signal for varying said transmission controlling means to focus said image carrying light rays on said focal plane in accordance with said range signal.

41. The camera of claim 39 wherein said one portion is an intial portion of said burst.

42. The camera of claim 41 wherein the frequency of said one portion decreases from an initial value to approximately the frequency of said other portion.

43. The camera of claim 39 wherein said transmitting, receiving, processing and producing means includes a filter and means for maintaining the Q of said filter at a relatively low value during the initial portion of said interval, when echoes are expected from relatively close subjects, so as to receive and provide a rapid response during said initial portion to echoes of all frequencies in said burst and for thereafter increasing said Q to a relatively high value so as to provide a response to an echo of said constant frequency from more remote subjects.

44. In a camera having actuable means for producing a film exposure in accordance with subject distance, and actuatable means for transmitting a burst of sonic energy toward a subject, for receiving and processing an echo from said subject within a predetermined interval following said transmission and for producing a range signal related to subject distance, the improvement comprising means for controlling said transmission means to produce a sonic burst having one portion varying in frequency and another portion of relatively constant frequency.

45. The camera of claim 44 wherein said transmitting, receiving, processing and producing means includes a filter and means for maintaining the Q of said filter at a relatively low value during the initial portion of said interval, when echoes are expected from relatively close subjects, so as to receive and provide a rapid response during said initial portion to echoes of all frequencies in said burst and for thereafter increasing said Q to a relatively high value so as to provide a response to an echo of said constant frequency from more remote subjects.

46. In a sonic ranging system including means actuatable for transmitting a burst of sonic energy toward a subject and for receiving and processing an echo from said subject so as to provide a time interval related to the range of said subject, the improvement comprising means for controlling said transmission means to produce a sonic multiple frequency burst with one frequency thereof being provided for a relatively short portion of said burst and another of said frequencies being maintained throughout at least a major portion of said burst whereby at least two frequencies may be relied upon to produce an appropriate echo from relatively near subjects and said other frequency alone may be relied upon for producing an appropriate echo from more remote subjects.

47. The system of claim 46 wherein said one frequency is produced during an initial portion of said burst.

48. The system of claim 46 wherein said one and said other frequency are sequentially produced.

49. The system of claim 46 additionally including a filter and means for automatically varying said filter such that the Q of said filter is varied from a low to a high value during a predetermined interval following said transmission.

50. The system of claim 49 wherein said filter is maintained relatively constant for approximately one-fifth to one-quarter of said interval and then varied to gradually increase the Q thereof.

51. The system of claim 46 wherein said means for controlling said transmission means produces a burst with at least two frequencies being provided during a small portion of said burst and at least said another frequency being maintained throughout a major portion of said burst.

52. In a sonic ranging system including means actuatable for transmitting a burst of sonic energy toward a subject and for receiving and processing an echo from said subject so as to produce a time interval related to the range of said subject, the improvement comprising means for controlling said transmission means to produce a sonic multiple frequency burst with one frequency thereof being provided for a relatively short portion of said burst and another of said frequencies being maintained throughout at least a greater portion of said burst whereby at least two frequencies may be relied upon to produce an appropriate echo from relatively near subjects and said other frequency alone may be relied upon for producing an appropriate echo from more remote subjects.

53. The system of claim 52 additionally including a filter and means for automatically varying said filter such that the Q of said filter is varied from a low to a high value during a predetermined interval following said transmission.

* * * * *